US012659012B2

(12) United States Patent
Roy et al.

(10) Patent No.: US 12,659,012 B2
(45) Date of Patent: Jun. 16, 2026

(54) WIRELESS DEVICE AND METHOD FOR WIRELESS COMMUNICATIONS

(71) Applicant: NXP USA, Inc., Austin, TX (US)

(72) Inventors: Sayak Roy, Kolkata (IN); Ankit Sethi, Pune (IN); Sudhir Srinivasa, Los Gatos, CA (US); Rui Cao, Sunnyvale, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 104 days.

(21) Appl. No.: 18/516,755

(22) Filed: Nov. 21, 2023

(65) Prior Publication Data

US 2024/0171254 A1 May 23, 2024

(30) Foreign Application Priority Data

Nov. 22, 2022 (IN) .............................. 202221066905

(51) Int. Cl.
*H04W 84/12* (2009.01)
*H04B 7/06* (2006.01)

(52) U.S. Cl.
CPC ........... *H04B 7/0697* (2013.01); *H04W 84/12* (2013.01)

(58) Field of Classification Search
CPC ............................. H04B 7/0697; H04W 84/12
See application file for complete search history.

(56) References Cited

U.S. PATENT DOCUMENTS

| | | | |
|---|---|---|---|
| 9,756,526 B2 | 9/2017 | Yang et al. | |
| 2005/0157808 A1* | 7/2005 | Ihm ........................ | H04L 1/0693 |
| | | | 375/267 |
| 2019/0115970 A1* | 4/2019 | Vermani ............... | H04L 5/0023 |

OTHER PUBLICATIONS

Erceg, Vinko et al. "Sounding and P Matrix Proposal", May 16, 2010, 14 pgs.
Sun, Yakun et al. "P Matrix for HE-LTF", Jul. 12, 2015, 19 pgs.
López, Miguel et al. "P matrices to support more than 8 TX chains", Nov. 7, 2019, 26 pgs.

* cited by examiner

*Primary Examiner* — Rahel Guarino

(57) ABSTRACT

Embodiments of an apparatus and method for wireless communications are disclosed. In an embodiment, a wireless device includes a controller configured to construct an orthogonal matrix, and a wireless transceiver configured to conduct wireless communications based on the orthogonal matrix. The size of the orthogonal matrix is 12×12 or 16×16.

21 Claims, 9 Drawing Sheets

902 —

CONSTRUCT AN ORTHOGONAL MATRIX, WHERE A SIZE OF THE ORTHOGONAL MATRIX IS 12X12 OR 16X16

904 —

CONDUCT WIRELESS COMMUNICATIONS BASED ON THE ORTHOGONAL MATRIX

400

500

S-MATRIX

CONSTRUCT AN ORTHOGONAL MATRIX, WHERE A SIZE OF THE ORTHOGONAL MATRIX IS 12X12 OR 16X16

902

CONDUCT WIRELESS COMMUNICATIONS BASED ON THE ORTHOGONAL MATRIX

904

WIRELESS DEVICE AND METHOD FOR WIRELESS COMMUNICATIONS

CROSS-REFERENCE TO RELATED APPLICATIONS

This application claims priority to Indian Provisional Patent Application Serial Number 202221066905, filed on Nov. 22, 2022, the contents of which are incorporated by reference herein.

BACKGROUND

Typically, wireless local area network (WLAN) (e.g., Wi-Fi 7) supports at most eight spatial streams. A developing WLAN standard (e.g., Wi-Fi 8) may support up to sixteen spatial streams. A P-matrix may provide information regarding the number of streams and the spatial multiplexing associated with the channel. However, presently, the P-matrix supports up to eight spatial streams, therefore generally cannot be utilized for a developing WLAN standard (e.g., Wi-Fi 8). Therefore, there is a need for matrix technology that can efficiently support an increased number of spatial streams.

SUMMARY

Embodiments of an apparatus and method for wireless communications are disclosed. In an embodiment, a wireless device includes a controller configured to construct an orthogonal matrix, and a wireless transceiver configured to conduct wireless communications based on the orthogonal matrix. The size of the orthogonal matrix is 12×12 or 16×16. Other embodiments are also described.

In an embodiment, the wireless transceiver is further configured to conduct long training field (LTF) transmission and reception based on the orthogonal matrix.

In an embodiment, the controller is further configured to construct LTFs using the orthogonal matrix for spatial streams, where the number of the spatial streams is larger than eight.

In an embodiment, the size of the orthogonal matrix is 12×12, and the number of the spatial streams is between 9 and 12.

In an embodiment, the size of the orthogonal matrix is 16×16, and the number of the spatial streams is between 13 and 16.

In an embodiment, the controller is further configured to construct the orthogonal matrix by reusing a second orthogonal matrix that has a size that is smaller than the size of the orthogonal matrix.

In an embodiment, the size of the orthogonal matrix is 16×16, and the controller is further configured to construct the orthogonal matrix by reusing an 8×8 orthogonal matrix.

In an embodiment, the size of the orthogonal matrix is 12×12, and the controller is further configured to construct the orthogonal matrix by reusing a 6×6 orthogonal matrix.

In an embodiment, the orthogonal matrix includes a Hadamard matrix with elements of +1 or −1.

In an embodiment, the controller is further configured to construct the orthogonal matrix by flipping signs of twelve elements of a 12×12 sub-matrix of a 16×16 P-matrix.

In an embodiment, the controller is further configured to construct the orthogonal matrix by replicating a sign flip operation within each of three 4×4 sub-matrices of the 12×12 sub-matrix.

In an embodiment, the controller is further configured to construct the orthogonal matrix by flipping signs of four elements of each of three 4×4 sub-matrices of the 12×12 sub-matrix.

In an embodiment, the wireless device is compatible with an Institute of Electrical and Electronics Engineers (IEEE) 802.11 protocol.

In an embodiment, a wireless device compatible with an IEEE 802.11 protocol includes a controller configured to construct a 12×12 orthogonal training matrix and a wireless transceiver configured to conduct long training field (LTF) transmission and reception based on the 12×12 orthogonal training matrix.

In an embodiment, the controller is further configured to construct LTFs using the 12×12 orthogonal training matrix for spatial streams, where a number of the spatial streams is larger than eight.

In an embodiment, the 12×12 orthogonal training matrix includes a Hadamard matrix with elements of +1 or −1.

In an embodiment, the controller is further configured to construct the 12×12 orthogonal training matrix by flipping signs of twelve elements of a 12×12 sub-matrix of a 16×16 P-matrix.

In an embodiment, the controller is further configured to construct the 12×12 orthogonal training matrix by replicating a sign flip operation within each of three 4×4 sub-matrices of the 12×12 sub-matrix.

In an embodiment, the controller is further configured to construct the 12×12 orthogonal training matrix by flipping signs of four elements of each of three 4×4 sub-matrices of the 12×12 sub-matrix.

In an embodiment, a method for wireless communications involves constructing an orthogonal matrix, where the size of the orthogonal matrix is 12×12 or 16×16, and conducting wireless communications based on the orthogonal matrix.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
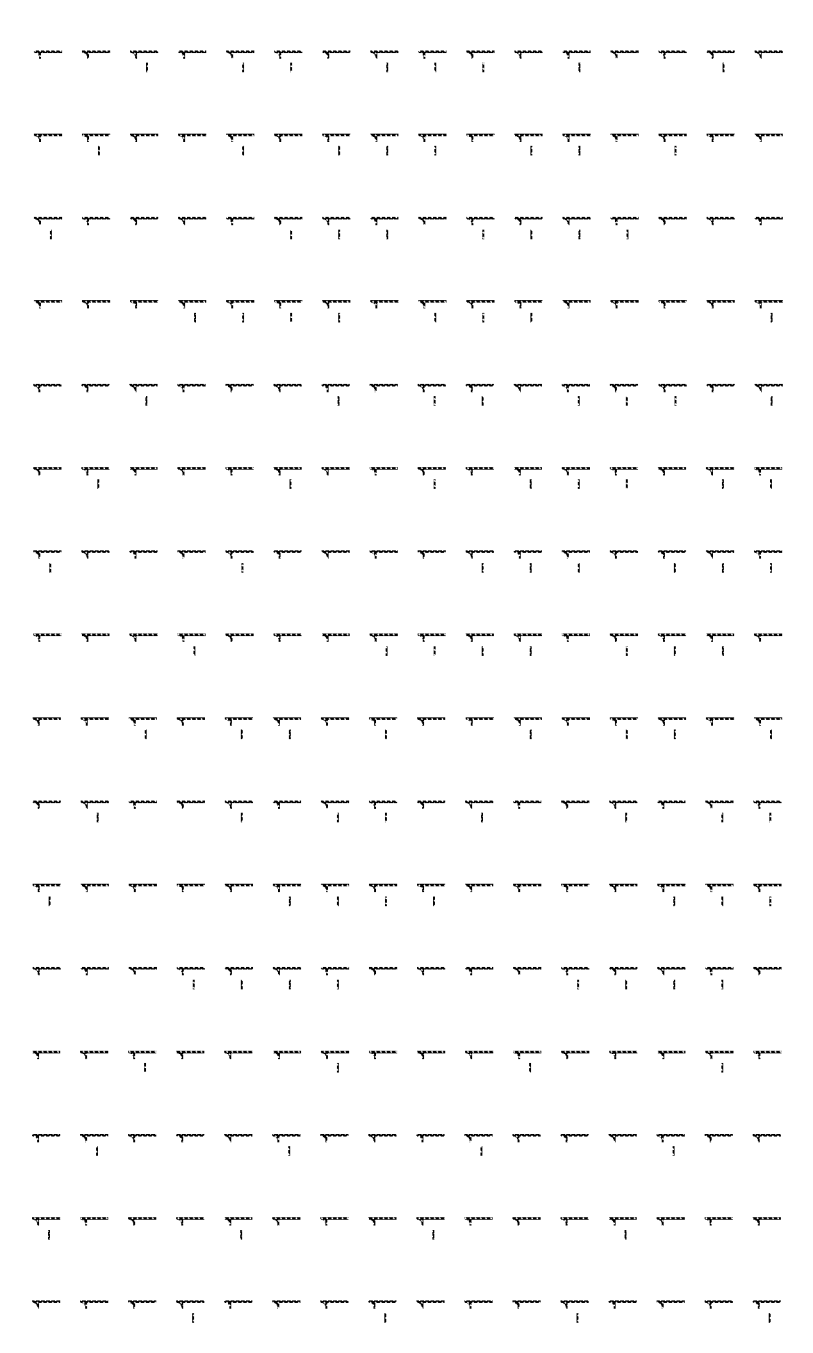
FIG. 1 depicts a P-matrix in accordance with an embodiment of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The present disclosure provides a method to generate a 12×12 P-matrix and a 16×16 P-matrix for a developing WLAN standard (e.g., Wi-Fi 8). In some embodiments, a P-matrix is a complex square matrix with every principal minor is a positive number. In some embodiments, the diagonal entries and the determinant of a P-matrix are positive numbers. The method further describes a generation of an orthogonal 12×12 P-matrix based on the 16×16 P-matrix. These matrices can be efficiently implemented by making only small changes on top of the existing design. Furthermore, up to 16 spatial streams may be supported based only on these two new matrices. The method further maximizes time spreading and enables complete utilization of power associated with a transmitter. Additionally, as the method enables the generation of the P matrices without additional hardware in the existing circuit, thus, overhead due to complexity is avoided. Matrices that are generated by methods in the present disclosure may be used for wireless communications in a wireless communications system. In embodiments of a wireless communications system, a wireless device, e.g., an access point (AP) of a WLAN may transmit data to at least one associated station (STA) or vice versa. The AP may be configured to operate with associated STAs according to a communication protocol. For example, the communication protocol may be an Institute of Electrical and Electronics Engineer (IEEE) 802.11 communication protocol.

FIG. 1 depicts a P-matrix 100 in accordance with an embodiment of the present disclosure. The P-matrix 100 may include 16 rows and 16 columns. Typically, in WLAN (e.g., Wi-Fi) standards, such as, IEEE 802.11ac, IEEE 802.11ax, and IEEE 802.11be standards or protocols, an 8×8 P-matrix is utilized. The P-matrix 100 may be obtained from 8×8 P matrices in the following manner:

$$P_{16 \times 16} = \begin{bmatrix} P_{8 \times 8} & P_{8 \times 8} \\ P_{8 \times 8} & -P_{8 \times 8} \end{bmatrix}, \tag{1}$$

where $P_{16 \times 16}$ represents the 16×16 P-matrix while $P_{8 \times 8}$ represents an 8×8 P-matrix. In an embodiment, the P-matrix 100 may correspond to a Hadamard matrix that includes 1 or −1 (i.e., composed of +1/−1 but no zeros). In some embodiments, both the transmitter side and the receiver side implement the same matrix for communications.

In another embodiment, a different 16×16 Hadamard matrix may be utilized instead of the P-matrix 100. In yet another embodiment, a 12×12 P-matrix may be constructed from the 6×6 P-matrix of an IEEE 802.11ac standard or protocol, an IEEE 802.11ax standard or protocol, or an IEEE 802.11be standard or protocol. The 12×12 P-matrix may be generated based on the 6×6 P-matrix as follows:

$$P_{12 \times 12} = \begin{bmatrix} P_{6 \times 6} & P_{6 \times 6} \\ P_{6 \times 6} & -P_{6 \times 6} \end{bmatrix} \tag{2}$$

$$P_{12 \times 12} = \begin{bmatrix} P_{6 \times 6} & P_{6 \times 6} \\ P_{6 \times 6} & -P_{6 \times 6} \end{bmatrix},$$

where $P_{12 \times 12}$ represents the 12×12 P-matrix while $P_{6 \times 6}$ represents a 6×6 P-matrix.

In another embodiment, a 12×12 P-matrix may be generated from the matrices derived from the optimal construction procedure described herein, by interchanging any number of rows/columns or by negating any one or multiple rows/columns. The 12×12 P-matrix may be utilized for space-time streams of 9 to 12 or smaller, and the 16×16 P-matrix may be used for space-time streams of 13 to 16 or smaller.

In some embodiments, a 12×12 P-matrix may be constructed by flipping signs of twelve elements of the upper-left 12×12 sub-matrix of a 16×16 P-matrix (e.g., from 1 to −1 or from −1 to 1), which helps to minimize the need for extra hardware on top of the 16×16 P matrix implementation.

Figure 2:
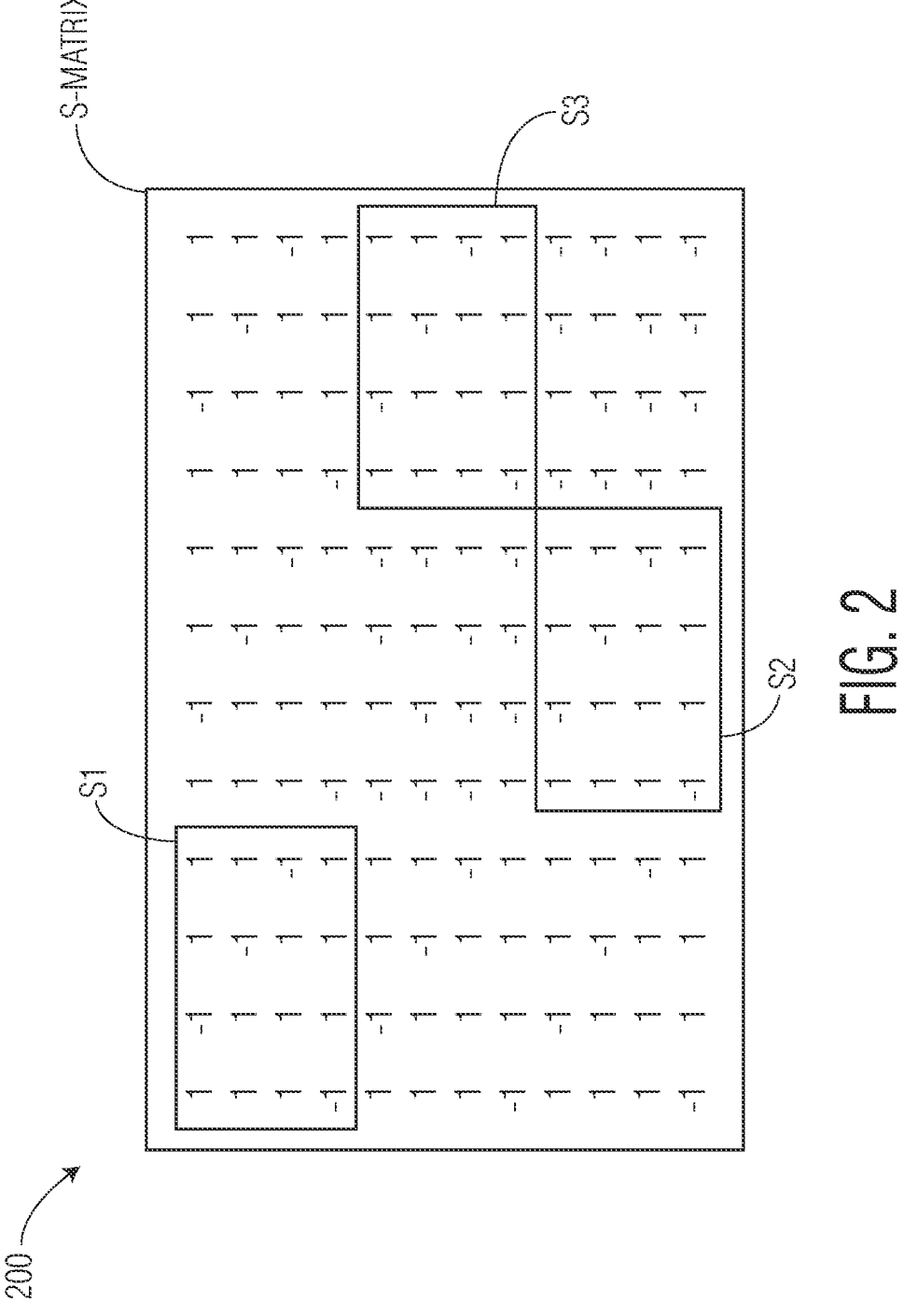
FIG. 2 depicts an S-matrix with 12 rows and 12 columns in accordance with an embodiment of the present disclosure.

FIG. 2 depicts an S-matrix 200 with 12 rows and 12 columns in accordance with an embodiment of the present disclosure. In the embodiment depicted in FIG. 2, the 12 rows and 12 columns of the S-matrix 200 are the upper left 12 rows and 12 columns of the P-matrix 100 as shown in FIG. 1. In the embodiment depicted in FIG. 2, the 12×12 S-matrix 200 includes a first sub-matrix S1 that includes elements present in the cells formed by the intersection of the first through fourth columns and first through fourth rows of the P-matrix 100, a second sub-matrix S2 that includes elements present in the cells formed by the intersection of the fifth through eighth columns and ninth through twelfth rows of the P-matrix 100, and a third sub-matrix S3 that includes elements present in the cells formed by the intersection of the ninth through twelfth columns and the fifth through eighth rows of the P-matrix 100. Each of the first through third sub-matrices S1-S3 includes the same 4×4 matrix as defined by WLAN (e.g., Wi-Fi) standards, for example, IEEE 802.11n, IEEE 802.11ac, IEEE 802.11ax, and IEEE 802.11be standards or protocols. Each of the first through third sub-matrices S1-S3 is further referred to as "A-matrix". The A-matrix can be perturbed to transform the 12×12 S-matrix into an orthogonal Hadamard P-matrix in a process illustrated in FIGS. 3-6.

Figure 3:
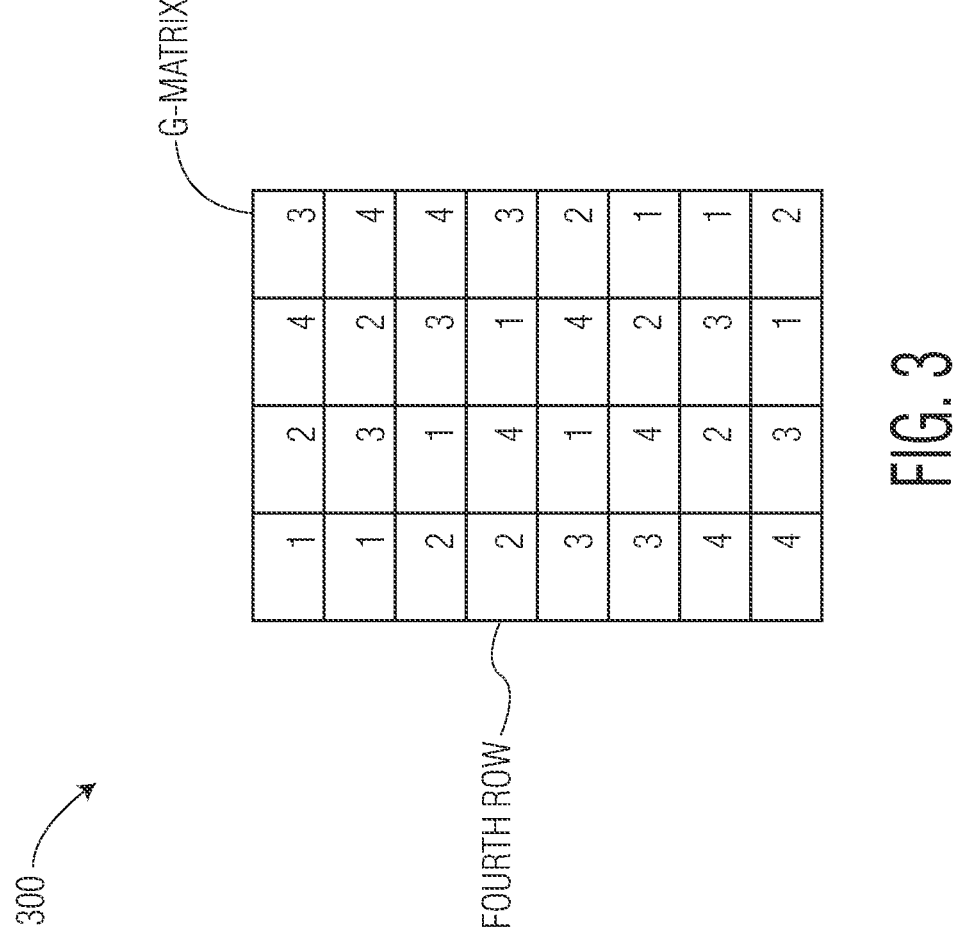
FIG. 3 depicts a G-matrix in accordance with an embodiment of the present disclosure.

FIG. 3 depicts a G-matrix 300 in accordance with an embodiment of the present disclosure. The G-matrix 300 can be utilized to obtain a 12×12 orthogonal P-matrix. For example, each row of the G-matrix 300 may be utilized to obtain a unique 12×12 orthogonal P-matrix. Based on a selection of a row of the G-matrix 300, a value of each cell of the G-matrix 300 is utilized to perturb the A matrix depicted in FIG. 2. In some embodiments, the first element of a selected row of the G-matrix 300 indicates the row index of an element in the first column of the A-matrix that is changed to the respective complementary sign (e.g., from 1 to −1 or from −1 to 1), the second element of the selected row of the G-matrix 300 indicates the row index of an element in the second column of the A-matrix that is changed to the respective complementary sign (e.g., from 1 to −1 or from −1 to 1), the third element of the selected row of the G-matrix 300 indicates the row index of an element in the third column of the A-matrix that is changed to the respective complementary sign (e.g., from 1 to −1 or from −1 to 1), and the fourth element of the selected row of the G-matrix 300 indicates the row index of an element in the fourth column of the A-matrix that is changed to the respective complementary sign (e.g., from 1 to −1 or from −1 to 1).

Figure 4:
FIG. 4 depicts an updated A-matrix in accordance with an embodiment of the present disclosure.
Figure 4:
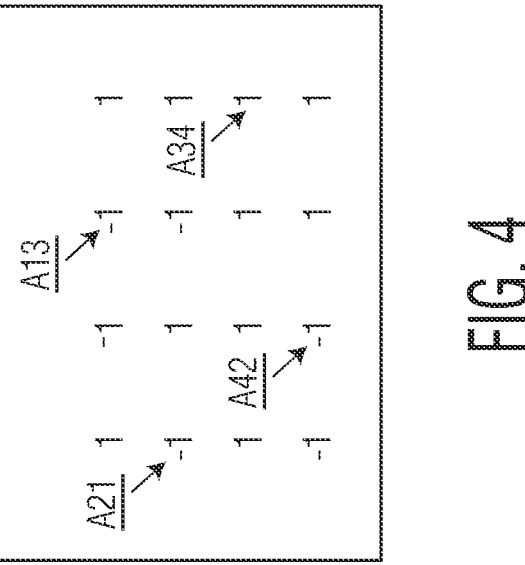

In an embodiment, the fourth row "2, 4, 1, 3" of the G-matrix 300 is selected. The first element of the fourth row of the G-matrix 300 indicates the row index of an element in the first column of the A-matrix (i.e., each of the first through third sub-matrices S1-S3) that is changed to the respective complementary sign, the second element of the fourth row of the G-matrix 300 indicates the row index of an element in the second column of the A-matrix that is changed to the respective complementary sign, the third element of the fourth row of the G-matrix 300 indicates the row index of an element in the third column of the A-matrix that is changed to the respective complementary sign, and the fourth element of the fourth row of the G-matrix 300 indicates the row index of an element in the fourth column of the A-matrix that is changed to the respective complementary sign. FIG. 4 depicts an updated A-matrix 400 in accordance with an embodiment of the present disclosure. The updated A-matrix 400 is obtained by perturbing the A-matrix (i.e., each of the first through third sub-matrices S1-S3) of FIG. 2 based on the fourth row of the G-matrix 300 of FIG. 3. For example, the elements of the fourth row are: 2, 4, 1 and 3 respectively. When the fourth row of G-matrix 300 is selected, the first element in the fourth row of G-matrix 300 has a value of 2. Based on the value 2, an element A21 having a value "1" in the second row and the first column is changed to the respective complementary sign "−1". The second element in the fourth row of G-matrix 300 is 4, therefore, an element A42 having a value "1" in the fourth row and the second column in A-matrix is changed to the respective complementary sign "−1". Similarly, the third element in the fourth row of G-matrix 300 is 1. Hence, an element A13 having a value "1" in the first row and the third column of A-matrix is changed to the respective complementary sign "−1". The last element in the fourth row of G-matrix 300 is 3. Thus, an element A34 having a value "−1" in the third row and the fourth column of A-matrix is changed to the respective complementary sign "1".

Figure 5:
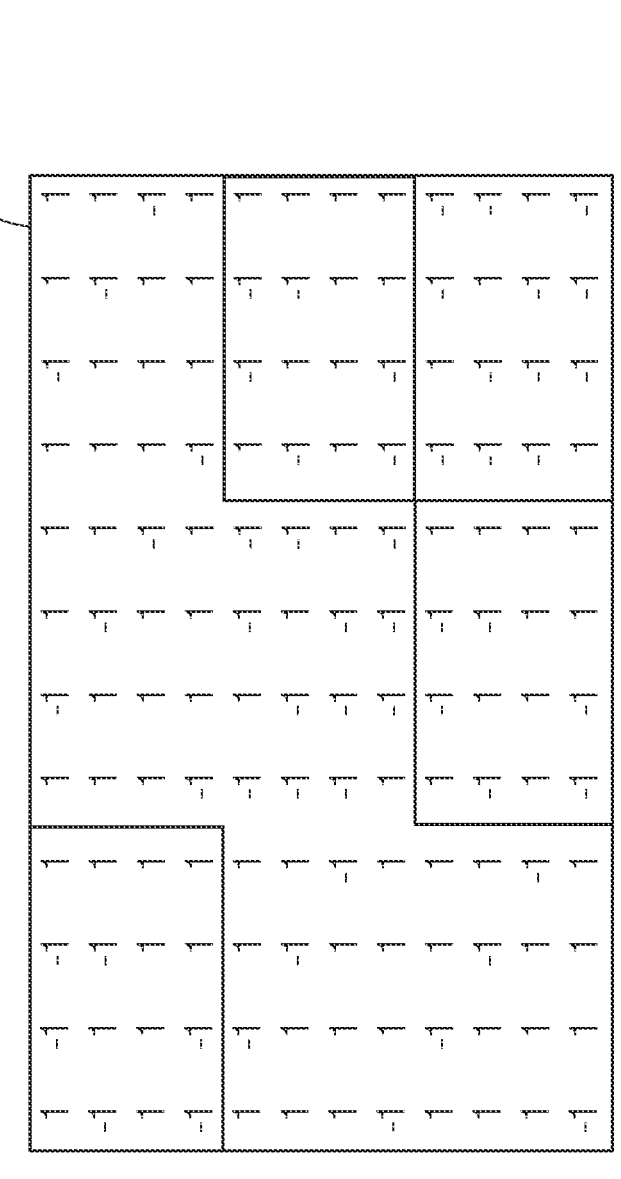
FIG. 5 depicts an updated S-matrix in accordance with an embodiment of the present disclosure.

FIG. 5 depicts an updated S-matrix 500 in accordance with an embodiment of the present disclosure. The first through third sub-matrices S1-S3 of the S-matrix 200 of FIG. 2 are replaced with the updated A-matrix 400 to generate the updated S-matrix 500. The updated S-matrix 500 is a 12×12 orthogonal Hadamard P-matrix. Similarly, other seven 12×12 orthogonal P matrices can be obtained using the other seven rows (row 1-row 3 and row 5-row 8) of the G matrix 300 depicted in FIG. 3. An exhaustive set of eight 12×12 P matrices may be generated based on perturbing 12 elements of the S-matrix 200. i.e., no other P matrices can be constructed using the S-matrix 200 depicted in FIG. 2 and perturbing only 12 elements (4 elements per box) from the boxed regions S1, S2, S3 as shown in FIG. 2. Furthermore, the above-described first through third sub-matrices S1-S3 are the only feasible choice, i.e., no other selection of three regions provides desirable results. The construction method of the present disclosure is optimal in the sense that it changes the minimum possible number of elements of the S-matrix 200. In some embodiments, both the transmitter side and the receiver side implement the same matrix.

Figure 6:
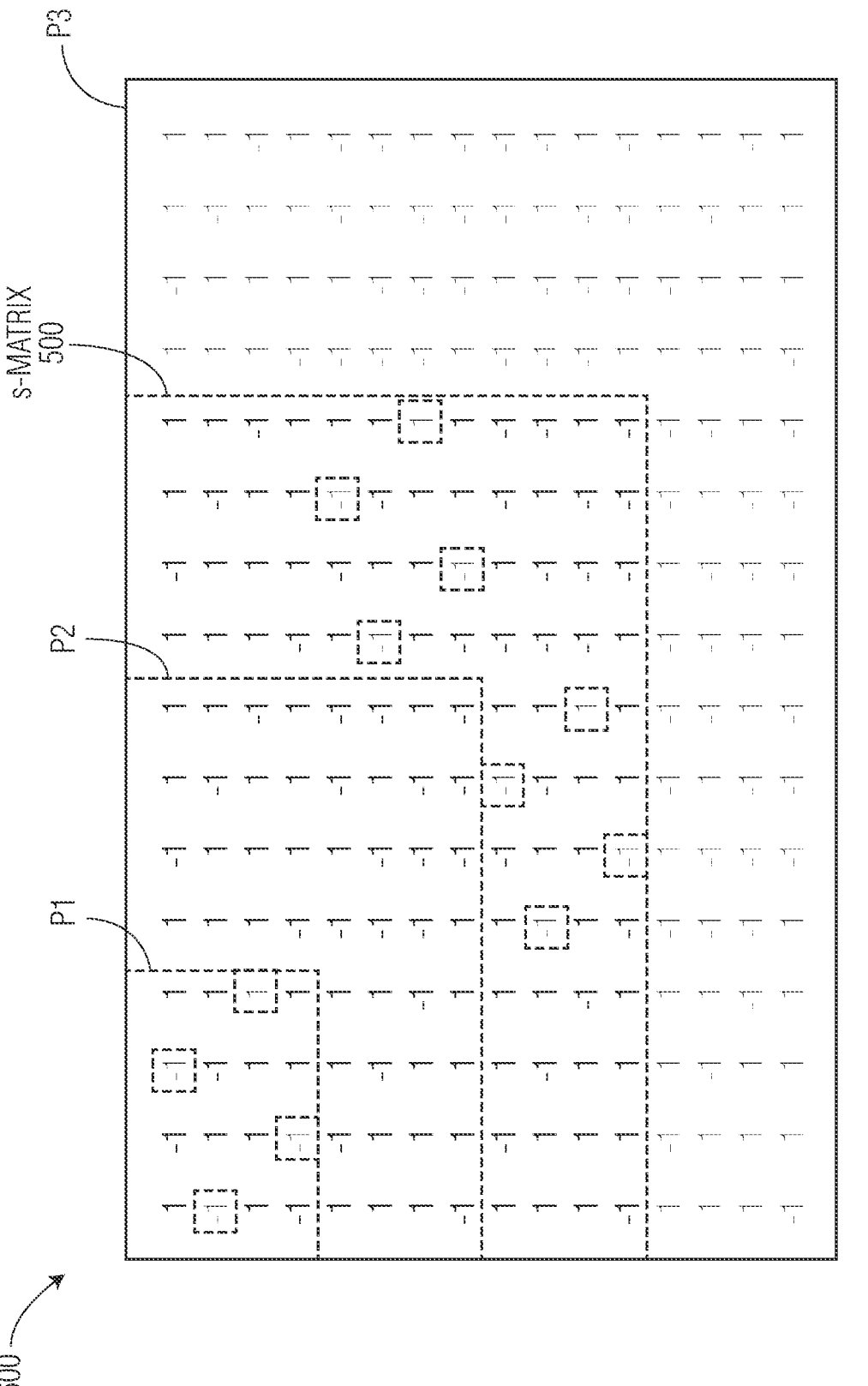
FIG. 6 depicts an updated P-matrix in accordance with an embodiment of the present disclosure.

FIG. 6 depicts an updated P-matrix 600 in accordance with an embodiment of the present disclosure. In the embodiment depicted in FIG. 6, the updated P-matrix 600 is the result of replacing the upper left 12 rows and 12 columns of the P-matrix 100 depicted in FIG. 1 with the updated S-matrix 500 depicted in FIG. 5. A combined view of 4×4, 8×8 and 16×16 P matrices along with the updated 12×12 S-matrix 500 is shown in FIG. 6. Specifically, a first 4×4 matrix P1, a second 8×8 matrix P2, the updated 12×12 S-matrix 500, and a third 16×16 matrix P3 are shown in FIG. 6. The dotted boxes show the elements of the updated S-matrix that need to be flipped in order to arrive at the 4×4 P1 matrix, the 8×8 P2 matrix and the 16×16 P3 matrix. In the embodiment depicted in FIG. 6, the fourth row of the G-matrix 300 depicted in FIG. 3 may be utilized to obtain the P-matrix 600. In another embodiment, a different row of the G-matrix 300 depicted in FIG. 3 is utilized, which results in a different P-matrix with different first through twelfth elements.

Any of the 12×12 P matrices may be utilized to generate one of 9, 10, 11, or 12 stream long training fields (LTFs). 12 long training field (LTF) symbols may be generated for one of 9, 10, 11, or 12 steams. Similarly, a 16×16 P-matrix may be utilized to generate one of 13, 14, 15, or 16 stream LTFs. 16 LTF symbols may be generated for one of 13,14,15, or 16 streams. Up to 16 streams may be covered based on two P matrices, thus achieving a good trade-off between the overhead and implementation complexity.

The present disclosure describes a technique to construct 12×12 P matrices for 12 LTF transmission and reception, having maximal overlap with the existing 8×8 P matrix in current Wi-Fi standards and a 16×16 P matrix for developing Wi-Fi standards. It has desirable properties of very low computational complexity, maximal temporal diversity, and balanced power output at the transmit antennas. In some embodiments, a method for constructing a long training field (LTF) using an orthogonal training matrix for each subcarrier in the dimensions of antenna and space-time streams is disclosed. In some embodiments, the number of space-time streams is larger than eight. In some embodiments, the size of the orthogonal training matrix can be 12 or 16. In some embodiments, the orthogonal training matrix of size 12 is used for space-time streams of 9 to 12 or smaller, and the orthogonal training matrix of size 16 is used for space-time streams of 13 to 16 or smaller. In some embodiments, for constructing an orthogonal training matrix of size 12, the matrix is designed by reusing the orthogonal training matrix of size 6. Alternatively, the matrix is designed by using one Hadamard matrix of size 12 with an element of +1/−1, using the upper left 12×12 sub-matrix of the 16×16 P matrix, and flipping signs of only twelve elements to arrive at the 12×12 P matrix (e.g., from 1 to −1 or from −1 to 1), using three boxed regions and replicating the sign flip operations within each of these boxed regions. In some embodiments, for constructing an orthogonal training matrix of size 16, the matrix is designed by reusing the orthogonal training matrix of size 8 or by using one Hadamard matrix of size 16.

Figure 7:
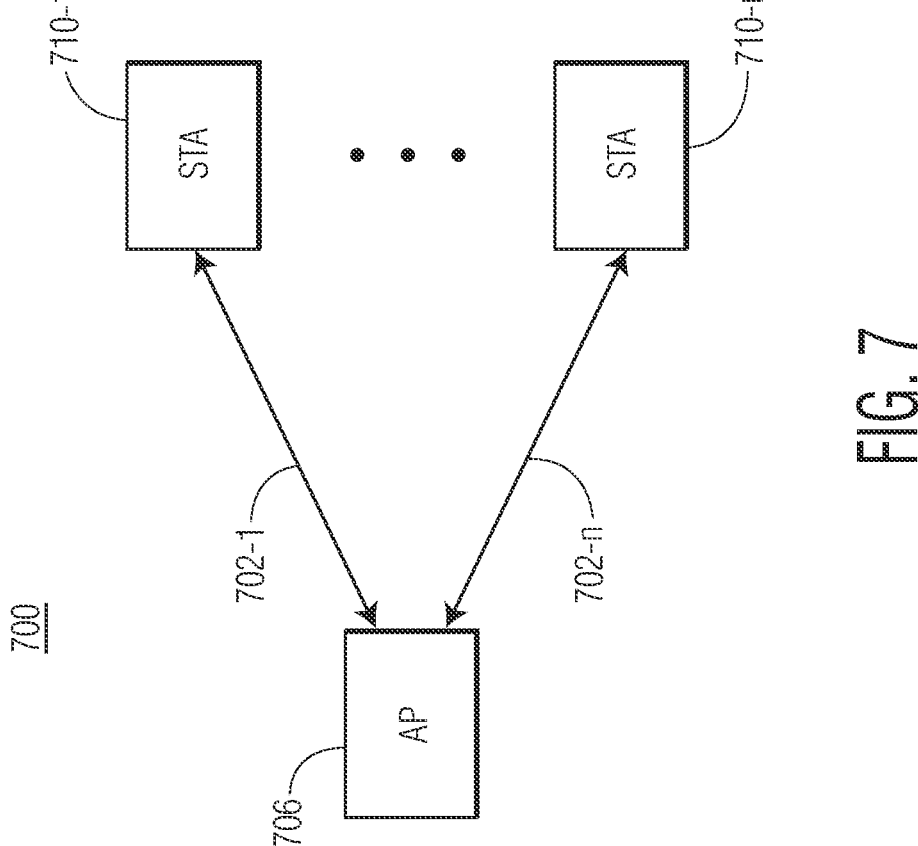
FIG. 7 depicts a wireless communications system in accordance with an embodiment of the invention.

Wireless communications devices, e.g., access points (APs) or non-AP devices can transmit various types of information using different transmission techniques. For example, various applications, such as, Internet of Things (IOT) applications can conduct wireless local area network (WLAN) communications, for example, based on Institute of Electrical and Electronics Engineers (IEEE) 802.11 family of standards (e.g., Wi-Fi standards). FIG. 7 depicts a wireless (e.g., WiFi) communications system 700 in accordance with an embodiment of the invention. In the embodiment depicted in FIG. 7, the wireless communications system 700 includes at least one AP 706 and at least one station (STA) 710-1, . . . , 710-n, where n is a positive integer. The wireless communications system can be used in various applications, such as industrial applications, medical applications, computer applications, and/or consumer or enterprise applications. In some embodiments, the wireless communications system is compatible with an IEEE 802.11 protocol. Although the depicted wireless communications system 700 is shown in FIG. 7 with certain components and described with certain functionality herein, other embodiments of the wireless communications system may include fewer or more components to implement the same, less, or more functionality. For example, in some embodiments, the wireless communications system includes multiple APs with one STA, multiple APs with multiple STAs, one AP with one STA, or one AP with multiple STAs. In another example, although the wireless communications system is shown in FIG. 7 as being connected in a certain topology, the network topology of the wireless communications system is not limited to the topology shown in FIG. 7. In some embodiments, the wireless communications system 700 described with reference to FIG. 7 involves single-link communications and the AP and the STA communicate through single communications links. In some embodiments, the wireless communications system 700 described with reference to FIG. 7 involves multi-link communications and the AP and the STA communicate through multiple communications links. Furthermore, the techniques described herein may also be applicable to each link of a multi-link communications system.

In the embodiment depicted in FIG. 7, the AP 706 may be implemented in hardware (e.g., circuits), software, firmware, or a combination thereof. The AP 706 may be fully or partially implemented as an integrated circuit (IC) device. In some embodiments, the AP 706 is a wireless AP compatible with at least one WLAN communications protocol (e.g., at least one IEEE 802.11 protocol). In some embodiments, the AP is a wireless AP that connects to a local area network (LAN) and/or to a backbone network (e.g., the Internet) through a wired connection and that wirelessly connects to one or more wireless stations (STAs), for example, through one or more WLAN communications protocols, such as the IEEE 802.11 protocol. In some embodiments, the AP includes at least one antenna, at least one transceiver operably connected to the at least one antenna, and at least one controller operably connected to the corresponding transceiver. In some embodiments, the transceiver includes a physical layer (PHY) device. The controller may be configured to control the transceiver to process received packets through the antenna. In some embodiments, the controller is implemented within a processor, such as a microcontroller, a host processor, a host, a digital signal processor (DSP), or a central processing unit (CPU), which can be integrated in a corresponding transceiver. In some embodiments, the AP 706 (e.g., a controller or a transceiver of the AP) implements upper layer Media Access Control (MAC) functionalities (e.g., beacon acknowledgement establishment, reordering of frames, etc.) and/or lower layer MAC functionalities (e.g., backoff, frame transmission, frame reception, etc.). Although the wireless communications system 700 is shown in FIG. 7 as including one AP, other embodiments of the wireless communications system 700 may include multiple APs. In these embodiments, each of the APs of the wireless communications system 700 may operate in a different frequency band. For example, one AP may operate in a 2.4 gigahertz (GHz) frequency band and another AP may operate in a 5 GHz frequency band.

In the embodiment depicted in FIG. 7, each of the at least one STA 710-1, . . . , 710-n may be implemented in hardware (e.g., circuits), software, firmware, or a combination thereof. The STA 710-1, . . . , or 710-n may be fully or partially implemented as IC devices. In some embodiments, the STA 710-1, . . . , or 710-n is a communications device compatible with at least one IEEE 802.11 protocol. In some embodiments, the STA 710-1, . . . , or 710-n is implemented in a laptop, a desktop personal computer (PC), a mobile phone, or other communications device that supports at least one WLAN communications protocol. In some embodiments, the STA 710-1, . . . , or 710-n implements a common MAC data service interface and a lower layer MAC data service interface. In some embodiments, the STA 710-1, . . . , or 710-n includes at least one antenna, at least one transceiver operably connected to the at least one antenna, and at least one controller connected to the corresponding transceiver. In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver.

In the embodiment depicted in FIG. 7, the AP 706 communicates with the at least one STA 710-1, . . . , 710-n via a communication link 702-1, . . . , 702-n, where n is a positive integer. In some embodiments, data communicated between the AP and the at least one STA 710-1, . . . , 710-n includes MAC protocol data units (MPDUs). An MPDU may include a frame header, a frame body, and a trailer with the MPDU payload encapsulated in the frame body.

Figure 8:
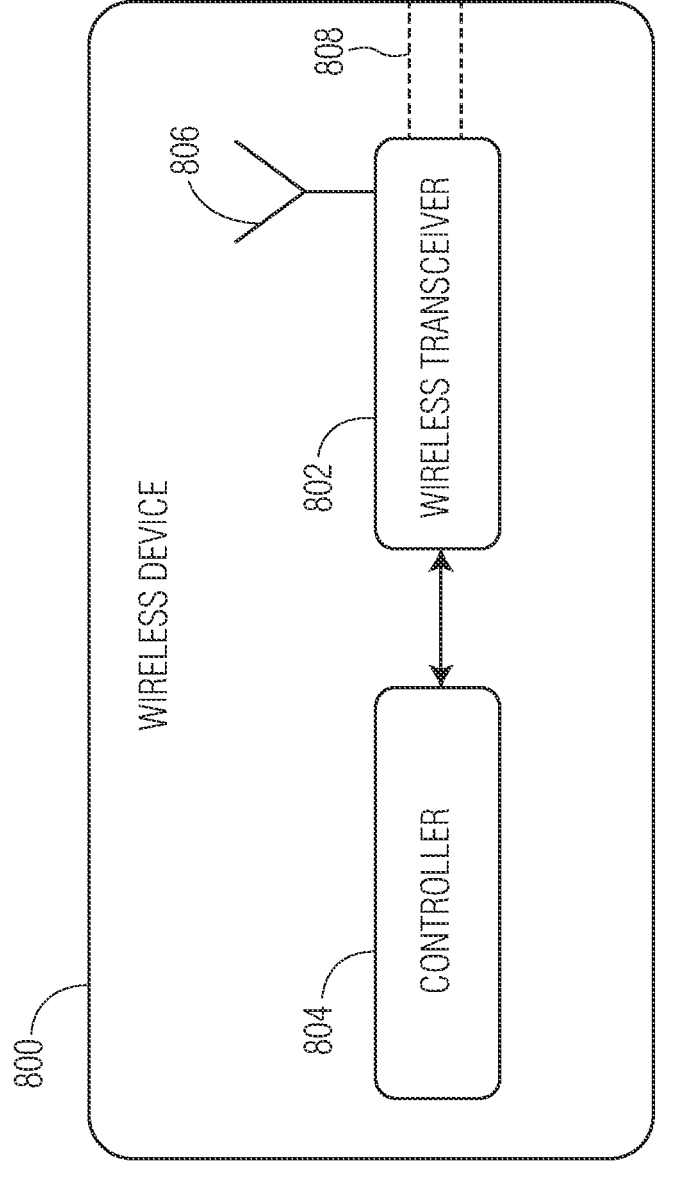
FIG. 8 depicts a wireless device in accordance with an embodiment of the invention.

FIG. 8 depicts a wireless device 800 in accordance with an embodiment of the invention. The wireless device 800 may be an embodiment of the at least one AP 706 and/or the at least one STA 710-1, . . . , 710-n depicted in FIG. 7. However, the at least one AP 706 and/or the at least one STA 710-1, . . . , 710-n depicted in FIG. 7 are not limited to the embodiment depicted in FIG. 8. In the embodiment depicted in FIG. 8, the wireless device 800 includes a wireless transceiver 802, a controller 804 operably connected to the wireless transceiver, and at least one antenna 806 operably connected to the wireless transceiver. In some embodiments, the wireless device 800 may include at least one optional network port 808 operably connected to the wireless transceiver. In some embodiments, the wireless transceiver includes a physical layer (PHY) device. The wireless transceiver may be any suitable type of wireless transceiver. For example, the wireless transceiver may be a wireless local area network (WLAN) transceiver (e.g., a transceiver compatible with an IEEE 802.11 protocol). In some embodiments, the wireless device 800 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. The wireless device 800 may be compatible with an IEEE 802.11 protocol.

In accordance with an embodiment of the invention, the controller 804 is configured to construct an orthogonal matrix, where the size of the orthogonal matrix is 12×12 or 16×16, and the wireless transceiver 802 is configured to conduct wireless communications based on the orthogonal matrix. In some embodiments, the wireless transceiver is further configured to conduct long training field (LTF) transmission and reception based on the orthogonal matrix. In some embodiments, the controller is further configured to construct LTFs using the orthogonal matrix for spatial streams, where the number of the spatial streams is larger than eight. In some embodiments, the size of the orthogonal matrix is 12×12, and the number of spatial streams is between 9 and 12. In some embodiments, the size of the orthogonal matrix is 16×16, and the number of spatial streams is between 13 and 16. In some embodiments, the controller is further configured to construct the orthogonal matrix by reusing a second orthogonal matrix that has a size that is smaller than the size of the orthogonal matrix. In some embodiments, the size of the orthogonal matrix is 16×16, and the controller is further configured to construct the orthogonal matrix by reusing an 8×8 orthogonal matrix. In some embodiments, the size of the orthogonal matrix is 12×12, and the controller is further configured to construct the orthogonal matrix by reusing a 6×6 orthogonal matrix. In some embodiments, the orthogonal matrix includes a Hadamard matrix with elements of +1 or −1. In some embodiments, the controller is further configured to construct the orthogonal matrix by flipping signs of twelve elements of a 12×12 sub-matrix of a 16×16 P-matrix. In some embodiments, the controller is further configured to construct the orthogonal matrix by replicating a sign flip operation within each of three 4×4 sub-matrices of the 12×12 sub-matrix (e.g., from 1 to −1 or from −1 to 1). In some embodiments, the controller is further configured to construct the orthogonal matrix by flipping signs of four elements of each of three 4×4 sub-matrices of the 12×12 sub-matrix (e.g., from 1 to −1 or from −1 to 1). In some embodiments, the wireless device is compatible with an Institute of Electrical and Electronics Engineers (IEEE) 802.11 protocol. In some embodiments, both the transmitter side and the receiver side implement the same matrix.

In some embodiments, the wireless device 800 is compatible with an IEEE 802.11 protocol, the controller 804 is configured to construct a 12×12 orthogonal training matrix, and the wireless transceiver 802 is configured to conduct long training field (LTF) transmission and reception based on the 12×12 orthogonal training matrix. In some embodiments, the controller is further configured to construct LTFs using the 12×12 orthogonal training matrix for spatial streams, where the number of the spatial streams is larger than eight. In some embodiments, the 12×12 orthogonal training matrix includes a Hadamard matrix with elements of +1 or −1. In some embodiments, the controller is further configured to construct the 12×12 orthogonal training matrix by flipping signs of twelve elements of a 12×12 sub-matrix of a 16×16 P-matrix (e.g., from 1 to −1 or from −1 to 1). In some embodiments, the controller is further configured to construct the 12×12 orthogonal training matrix by replicating a sign flip operation within each of three 4×4 sub-matrices of the 12×12 sub-matrix (e.g., from 1 to −1 or from −1 to 1). In some embodiments, the controller is further configured to construct the 12×12 orthogonal training matrix by flipping signs of four elements of each of three 4×4 sub-matrices of the 12×12 sub-matrix. In some embodiments, both the transmitter side and the receiver side implement the same matrix.

Figure 9:
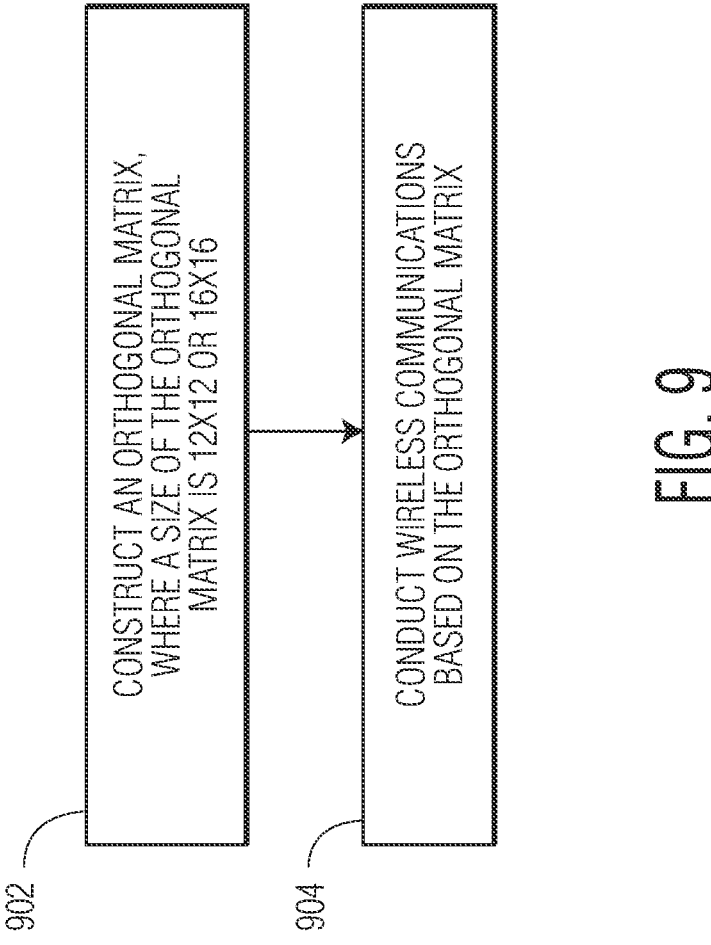
FIG. 9 is a process flow diagram of a method for wireless communications in accordance with an embodiment of the invention.

FIG. 9 is a process flow diagram of a method for wireless communications in accordance with an embodiment of the invention. At block 902, an orthogonal matrix is constructed, where a size of the orthogonal matrix is 12×12 or 16×16. At block 904, wireless communications are conducted based on the orthogonal matrix. In some embodiments, long training field (LTF) transmission and reception is conducted based on the orthogonal matrix. In some embodiments, multiple LTFs are constructed using the orthogonal matrix for multiple spatial streams, where the number of the spatial streams is larger than eight. In some embodiments, the size of the orthogonal matrix is 12×12, and the number of spatial streams is between 9 and 12. In some embodiments, the size of the orthogonal matrix is 16×16, and the number of spatial streams is between 13 and 16. In some embodiments, the orthogonal matrix is constructed by reusing a second orthogonal matrix that has a size that is smaller than the size of the orthogonal matrix. In some embodiments, the size of the orthogonal matrix is 16×16, and the orthogonal matrix is constructed by reusing an 8×8 orthogonal matrix. In some embodiments, the size of the orthogonal matrix is 12×12, and the orthogonal matrix is constructed by reusing a 6×6 orthogonal matrix. In some embodiments, the orthogonal matrix includes a Hadamard matrix with elements of +1 or −1. In some embodiments, the orthogonal matrix is constructed by flipping signs of twelve elements of a 12×12 sub-matrix of a 16×16 P-matrix. In some embodiments, the orthogonal matrix is constructed by replicating a sign flip operation within each of three 4×4 sub-matrices of the 12×12 sub-matrix. In some embodiments, the orthogonal matrix is constructed by flipping signs of four elements of each of three 4×4 sub-matrices of the 12×12 sub-matrix.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless device comprising:
a controller configured to construct an orthogonal matrix, wherein a size of the orthogonal matrix is 12×12 or 16×16; and
a wireless transceiver configured to conduct wireless communications based on the orthogonal matrix;
wherein the controller is further configured to construct the orthogonal matrix by reusing a second orthogonal matrix that has a size that is smaller than the size of the orthogonal matrix.

2. The wireless device of claim 1, wherein the wireless transceiver is further configured to conduct long training field (LTF) transmission and reception based on the orthogonal matrix.

3. The wireless device of claim 2, wherein the controller is further configured to construct a plurality of LTFs using the orthogonal matrix for a plurality of spatial streams, wherein a number of the spatial streams is larger than eight.

4. The wireless device of claim 3, wherein the size of the orthogonal matrix is 12×12, and wherein the number of the spatial streams is between 9 and 12.

5. The wireless device of claim 3, wherein the size of the orthogonal matrix is 16×16, and wherein the number of the spatial streams is between 13 and 16.

6. The wireless device of claim 1, wherein the size of the orthogonal matrix is 16×16, and wherein the controller is further configured to construct the orthogonal matrix by reusing an 8×8 orthogonal matrix.

7. The wireless device of claim 1, wherein the size of the orthogonal matrix is 12×12, and wherein the controller is further configured to construct the orthogonal matrix by reusing a 6×6 orthogonal matrix.

8. The wireless device of claim 1, wherein the orthogonal matrix comprises a Hadamard matrix with a plurality of elements of +1 or −1.

9. The wireless device of claim 1, wherein the controller is further configured to construct the orthogonal matrix by flipping signs of twelve elements of a 12×12 sub-matrix of a 16×16 P-matrix.

10. The wireless device of claim 9, wherein the controller is further configured to construct the orthogonal matrix by replicating a sign flip operation within each of three 4×4 sub-matrices of the 12×12 sub-matrix.

11. The wireless device of claim 10, wherein the controller is further configured to construct the orthogonal matrix by flipping signs of four elements of each of three 4×4 sub-matrices of the 12×12 sub-matrix.

12. The wireless device of claim 1, wherein the wireless device is compatible with an Institute of Electrical and Electronics Engineers (IEEE) 802.11 protocol.

13. A wireless device compatible with an Institute of Electrical and Electronics Engineers (IEEE) 802.11 protocol, the wireless device comprising:
a controller configured to construct a 12×12 orthogonal training matrix; and
a wireless transceiver configured to conduct long training field (LTF) transmission and reception based on the 12×12 orthogonal training matrix.

14. The wireless device of claim 13, wherein the controller is further configured to construct a plurality of LTFs using the 12×12 orthogonal training matrix for a plurality of spatial streams, wherein a number of the spatial streams is larger than eight.

15. The wireless device of claim 13, wherein the 12×12 orthogonal training matrix comprises a Hadamard matrix with a plurality of elements of +1 or −1.

16. The wireless device of claim 13, wherein the controller is further configured to construct the 12×12 orthogonal training matrix by flipping signs of twelve elements of a 12×12 sub-matrix of a 16×16 P-matrix.

17. The wireless device of claim 16, wherein the controller is further configured to construct the 12×12 orthogonal training matrix by replicating a sign flip operation within each of three 4×4 sub-matrices of the 12×12 sub-matrix.

18. The wireless device of claim 17, wherein the controller is further configured to construct the 12×12 orthogonal training matrix by flipping signs of four elements of each of three 4×4 sub-matrices of the 12×12 sub-matrix.

19. A method for wireless communications, the method comprising:
constructing an orthogonal training matrix, wherein a size of the orthogonal training matrix is 12×12 or 16×16;
conducting wireless communications based on the orthogonal training matrix; and
construct the 12×12 orthogonal training matrix by flipping signs of twelve elements of a 12×12 sub-matrix of a 16×16 P-matrix.

20. A wireless device comprising:
a controller configured to construct an orthogonal matrix, wherein a size of the orthogonal matrix is 12×12 or 16×16; and
a wireless transceiver configured to conduct wireless communications based on the orthogonal matrix;
wherein the controller is further configured to construct the orthogonal matrix by flipping signs of twelve elements of a 12×12 sub-matrix of a 16×16 P-matrix.

21. A wireless device comprising:
constructing an orthogonal training matrix;
wherein a size of the orthogonal training matrix is 12×12 or 16×16; and
a wireless transceiver configured to conduct wireless communications based on the orthogonal training matrix;
wherein constructing includes at least:
selecting upper left 12 rows and 12 columns of a 16×16 P-matrix;

defining a first sub-matrix S1 as an intersection of a first through a fourth columns and a first through a fourth rows of the 16×16 P-matrix;

defining a second sub-matrix S2 as an intersection of a fifth through an eighth columns and a ninth through a twelfth rows of the 16×16 P-matrix;

defining a third sub-matrix S3 as an intersection of a ninth through a twelfth columns and the fifth through the eighth rows of the 16×16 P-matrix; and defining a G-matrix configured to identify elements within the S1, S2, and S3 sub-matrixes whose bits are to be flipped in sign.

* * * * *